Figure 7:
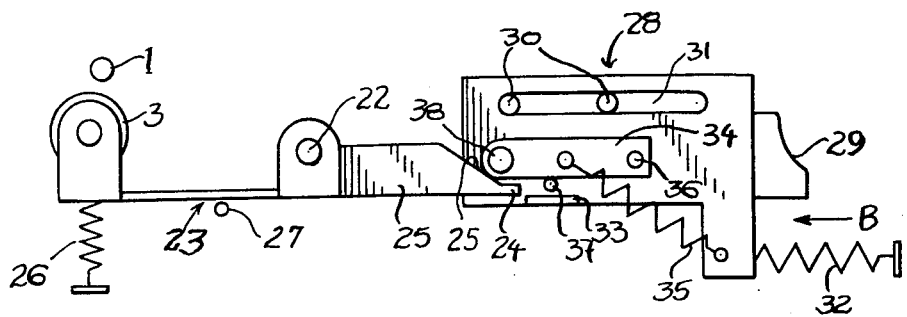

United States Patent [19]
Mizuki

[11] 4,090,783
[45] May 23, 1978

[54] PINCH ROLLER ACTUATING DEVICE

[75] Inventor: Yoshiaki Mizuki, Iruma, Japan

[73] Assignee: Nihon Beru-Haueru Kabushiki Kaisha (Bell & Howell Japan, Ltd.), Higashimurayama, Japan

[21] Appl. No.: 724,493

[22] Filed: Sep. 20, 1976

[30] Foreign Application Priority Data

Sep. 20, 1975  Japan ................................ 50-113905

[51] Int. Cl.² .............................................. G03B 31/02
[52] U.S. Cl. ........................................ 352/27; 352/72; 352/174
[58] Field of Search ................... 352/27, 72, 174, 178

[56] References Cited

U.S. PATENT DOCUMENTS

| | | | |
|---|---|---|---|
| 3,880,504 | 4/1975 | Marvin | 352/27 |
| 3,958,868 | 5/1976 | Mizuki | 352/27 |
| 3,963,331 | 6/1976 | Komine | 352/72 |

Primary Examiner—Monroe H. Hayes
Attorney, Agent, or Firm—John E. Peele, Jr.; Aaron Passman

[57] ABSTRACT

A pinch roller actuating device for a sound motion picture camera including a portion connected to a rotatable pinch roller to maintain the roller out of and in engagement with a capstan responsive to a movable camera actuating member having a limiting stop which defines the maximum displacement of the actuating member. A spring member is provided to move the pinch roller into engagement with the capstan after the actuating member is displaced beyond its mid-point. A bracket is arranged to prevent movement by the spring when the stopper engages the connecting portion, and instantly engages the pinch roller with the capstan by being suddenly moved by the spring member when the connection between the stopper and the connecting portion is released.

5 Claims, 9 Drawing Figures

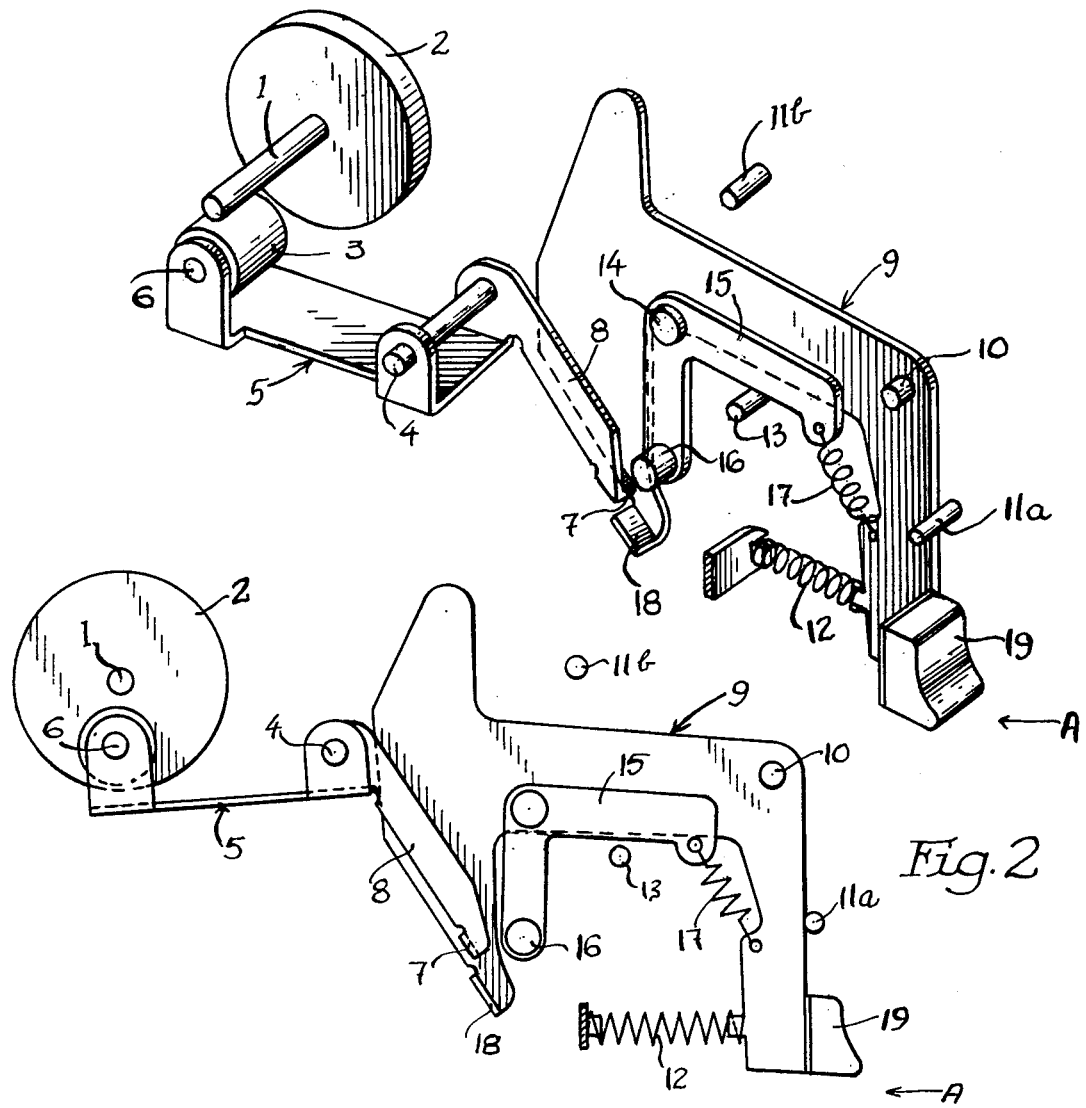
Fig. 1
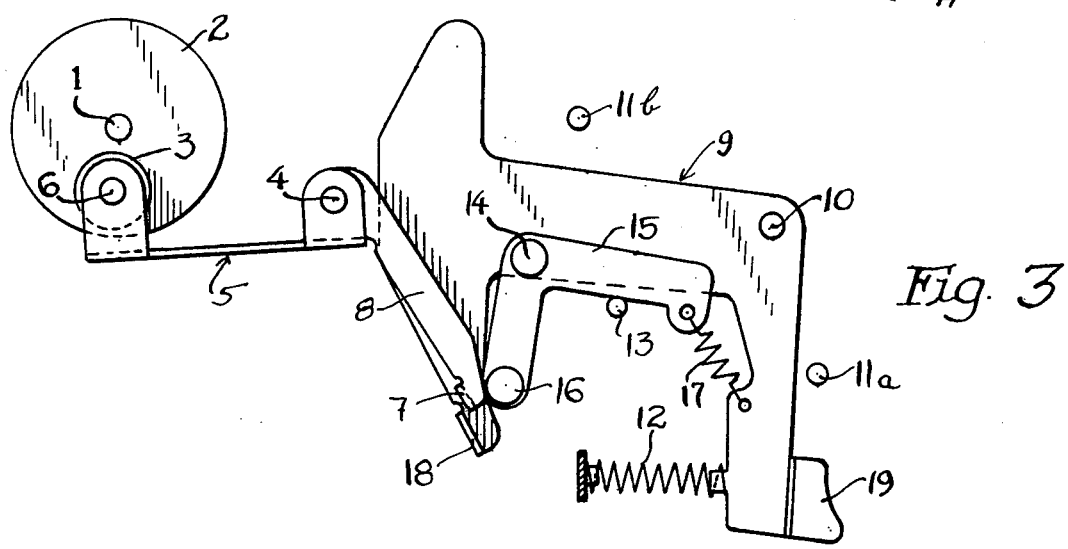
Fig. 2
Fig. 3

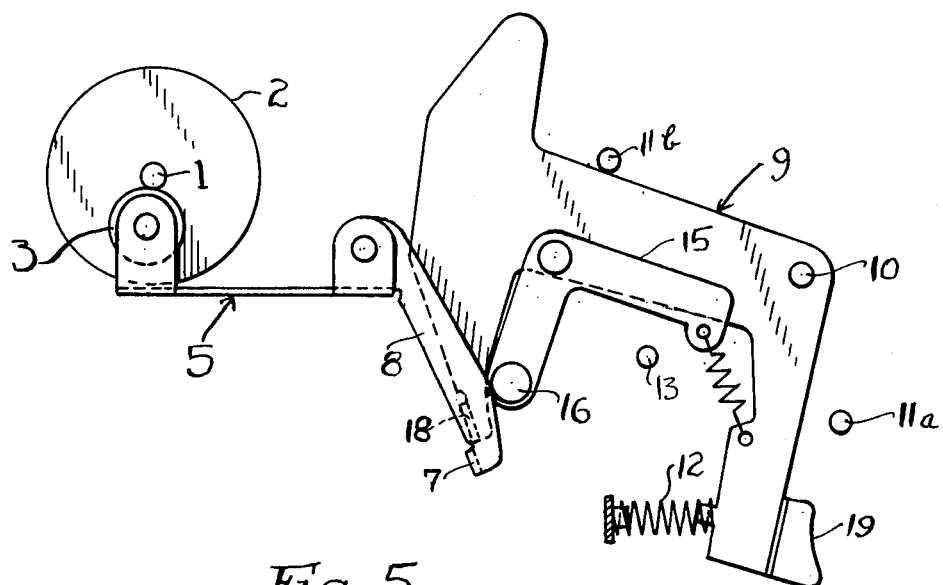
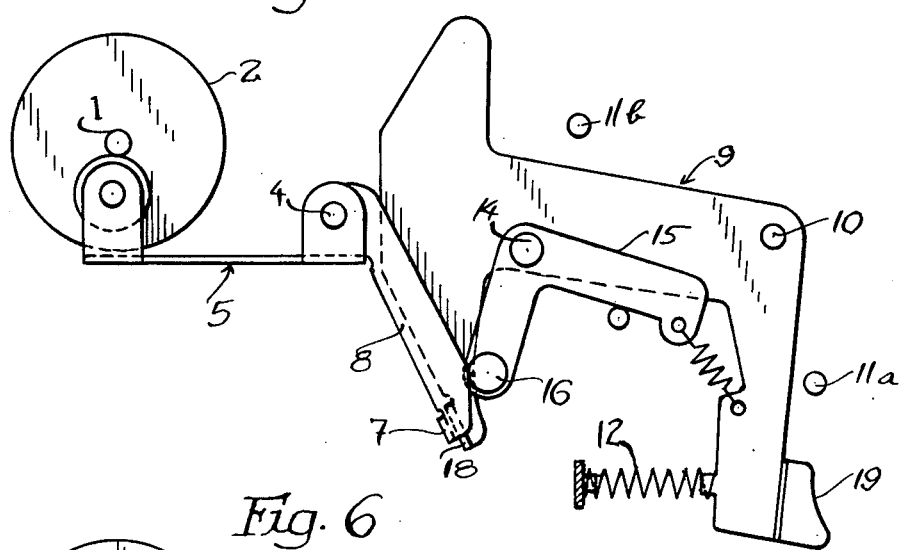
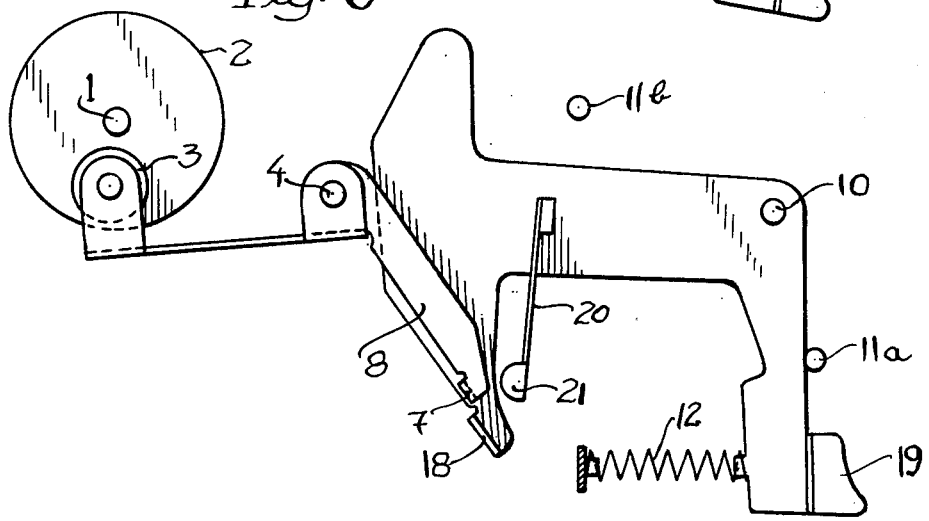

PINCH ROLLER ACTUATING DEVICE

This invention relates to a pinch roller actuating device and more particularly relates to such a device for use in a sound motion picture camera in which a film is transported past an aperture station and past a recording station. At the aperture station, the film is transported intermittently by a shuttle, and at the recording station, the film is transported smoothly by a capstan which rotates constantly as the film is held in engagement with the capstan by a pinch roller.

When the motion picture camera is not in operation, the pinch roller is spaced apart from the capstan to preclude the generation of flats on the elements. However, when the camera is in operation, the pinch roller is in contact with the capstan, with the film therebetween. To insure smooth transport of the film through the sound recording station, the capstan is rotated before the shuttle begins transporting the film with intermittent steps.

To insure smooth transport of the film through the sound recording station upon start up of the camera, rotation of the capstan is started before movement of the shuttle beings. Usually, in the first stage following actuation of the camera trigger member, the pinch roller and the capstan are brought together with a gradually changing engagement pressure. The changing pressure causes the film to be transported for one or two frames at a speed other than the intended rate, for example 18 frames per second. That is, as the pinch roller is brought into engagement with the capstan, by the movement of the start button of the camera, the film is not transported at the desired definite speed as the contact in the first stage of engagement is initiated by an incomplete actuation of the start button.

When the pinch roller engages the capstan in a manner to transport film at the definite speed, the shuttle has reached speed to transport the film past the aperture station at the proper rate. Image-sound synchronization problems can arise if the film is transported through the recording station before the film is being transported by the shuttle or if the length of the loop between the aperture station and the sound recording station is changed.

To overcome these problems as to starting the film transport with desired image-sound synchronization, an improved pinch roller actuating device is provided wherein upon initial movement of the camera actuating device, the pinch roller is delayed for an instant from engaging the film against the capstan. Following movement of the actuating device further, the pinch roller is caused to move instantly into engagement with the capstan. Further movement of the actuating device either because of more or less pressure is isolated from movement of the pinch roller by a blocking member which prevents the pinch roller from being displaced until the blocking member is moved beyond a connecting portion. At this time, the pinch roller is released an instant before camera operation is stopped.

Thus, an object of the invention is to provide a device for causing the pinch roller to be moved instantly into and out of engagement with a capstan rather than to be moved gradually into and out of engagement therewith.

Further and other objects will become more apparent from the description of the accompanyinhg drawings in which like numerals refer to like parts.

In the drawings,

FIG. 1 is a partial perspective view of the sound station components of a sound motion picture camera incorporating the pinch roller actuating device of the present invention, with parts not shown for clarity, and associated camera components;

FIGS. 2–5 are elevational views of the components shwon in FIG. 1 with the components displaced to different conditions, FIG. 2 respectively, at rest condition, in partially actuated condition FIG. 3, in fully actuated condition FIG. 4, and in partially released from fully actuated condition FIG. 5; and FIGS. 6–9 are semi schematic, elevational views of other embodiments of the pinch roller actuating assembly components, and associated camera components, according to the invention as disclosed with respect to FIG. 1.

During camera operation as film is transported, a capstan 1 is rotated smoothly and continuously by a flywheel 2 which is rotatably driven by a motor (not shown). A pinch roller 3 is rotatable about an axis 6 on a bracket 5 which is moved around an axis 4 to cause the pinch roller 3 to move closer to and away from the capstan 1. The bracket 5 is provided with an arm 8 on which a connecting portion 7 is formed. In this embodiment, the connecting potion 7 is a foot member extending from the plane of the arm 8. A camera actuating or trigger member 9 is supported about another axis 10 for pivotable movement between stop elements 11a and 11b. Usually, the trigger member is biased by a spring 12 in a counter-clockwise direction to rest against the stop element 11a. On the trigger member 9, a lever 15 is provided, which lever 15 is biased by a spring member 17 in a clockwise direction about axis 14 and is stopped by a stopper 13. On the lever 15, a pin 16 is arranged to engage a blocking tab portion 18 carried on the trigger member 9. The tab 18 extends from the plane of the trigger member 9 into the path of the connecting portion foot member 7 of the bracket 5. One end of the spring member 17 is fixed to an arm of the lever 15, and the other end is connected to the trigger member 9. A trigger or actuating button 19 is carried on a portion of the trigger member 9.

As described above, the mechanism of this preferred embodiment includes the trigger member 9 which is rotatable in a clockwise direction about axis 10. This rotation occurs when the actuating button 19 is depressed in the direction shown by the arrow A against the force of the spring 12. Also, the lever 15 on the trigger member 9 is caused to be rotated in the clockwise direction about the axis 14 as the trigger member 9 is rotated. When the trigger member 9 and the lever 15 are held rotated in the clockwise direction in that the actuating button 19 is held depressed, the pin 16 on the lever 15 is maintained in engagement with the edge of the arm 8 on the bracket 5. At the same time, the blocking tab 18 on the trigger member 9 is positioned opposite to the pin 16 with the connection portion foot 7 therebetween see FIG. 3.

When the actuating button 19 is depressed further, as from the position shown in FIG. 3 to the position shown in FIG. 4, the arm 8 caused to rotate about the axis 4 in the clockwise direction as the pin 16 rides on the edge of the arm 8, as seen in FIG. 3. As the blocking tab member 18 is moved behind the foot portion 7 during the time the pin 16 is moved, the arm 8 cannot be rotated further in the clockwise direction since the blocking tab member 18 precludes such movement of the connecting portion 7. Therefore, the pinch roller 3 cannot move in the direction of the capstan 1.

When the actuating button 19 is retained in a depressed condition, the trigger member 9 is retained rotated in the clockwise direction about axis 10. However, the lever 15 is rotated slightly about axis 14 in the counter-clockwise direction due to the spring member 17.

The pin 16 carried on the lever is displaced further by the edge of the arm 8. In this condition, the arm 8 tends to rotate in the clockwise direction by the repulsion of the spring member 17. Nevertheless, the arm 8 cannot be rotated because the rotation of the connecting portion 7 is precluded from rotation by the tab member 18.

When the blocking tab member 18 is moved past the connecting foot portion 7 after the trigger member 9 is rotated further in the clockwise direction from the position of FIG. 3, the arm 8 is suddenly rotated in the clockwise direction by the biasing of the spring member 17. This spring has been tensioned since the arm 8 was not permitted to be rotated in the clockwise direction. Rotation of arm 8 was permitted when the trigger member 9 was rotated further to move the blocking tab 18 clear of the connecting foot 7. At that instant, the pinch roller 3 is caused by the spring 17 to move instantly into engagement with the capstan 1. The pressure between the capstan and the pinch roller is selected to be suitable to transport film at the desired speed when the film is engaged. That is, when the pinch roller engages the capstan as in FIG. 4, the film is transported past the aperture station by the shuttle (not shown) which is driven when a camera energizing circuit is closed through a switch actuated by the trigger member. Rotation of the trigger member 9 is stopped by the stop element 11b.

Upon release of the actuator button 19 after completion of photographing a sequence, the trigger member 9 begins to rotate in the counter clockwise direction under the influence of spring 12. As the trigger member moves, as shown between FIGS. 4 and 5, the lever 15 continues to cause the pinch roller 3 to engage the capstan 1. The pin 16 on the lever 15 continues to engage the edge of arm 8 in engagement therewith as the lever 15 is biased in a clockwise direction by the spring 17. As the trigger member 9 moves further in the counter clockwise direction and the arm 15 is moved in the clockwise direction, the pinch roller 3 ultimately separates from the capstan either under the force of gravity or by urging of a not shown light spring member. The movement of the pinch roller stops as the supporting arm engages a stop member (not shown) substantially simultaneously as the pin 16 on the lever 15 separates from the edge of the arm 8. Finally, the pinch roller and the trigger member 9 return to their respective rest positions as shown in FIGS. 1 and 2.

During manual operation of the camera, the operator often is unable to maintain the trigger member depressed at a constant pressure. Thus, often a partial release of the trigger member can cause complete, although temporary, termination of film transport. To overcome this problem, the pinch roller actuating mechanism provides an interlock to preclude disengagement of the pinch roller from the capstan under partial release of the trigger member. Since the pinch roller 3 remains in engagement with the capstan 1 via the pin 16, the blocking portion 18 on the trigger member 9 moves into a blocking position with respect to the connecting portion foot 7. In this position, the minor movements of the trigger member 9 are isolated from the pinch roller carrier so that the pinch roller 3 cannot be disengaged from the capstan, and the pressure of engagement with the capstan is unchanged. The connecting portion 7 on the arm 8 moves through an arc outside of the arc through which the pin 16 moves when the pinch roller is in engagement with the capstan. The connecting portion 7 remains in that position until the trigger member 9 moves sufficiently to clear the blocking tab 18 from path of the foot portion 7. Only then can the carrier 5 pivot to disengage the pinch roller from the capstan. That is, the connecting portion 7 is retained between the blocking tab 18 and the pin 16 until the completion of movement of the trigger member 9 whereby the connecting portion 7 is released for movement to the inactive condition. Spring 12, required to be relatively strong, completes the movement of the trigger member 9 to the inactive condition when the operator removes the pressure to release the actuator member.

In FIG. 6 is shown another embodiment of the pinch roller actuating mechanism. A spring member 20, having an actuating tip 21, is mounted on the trigger member 9 to transfer movement of that member to the pinch roller carrier. Since the principle effect and the motions are substantially the same as those described above with respect to FIGS. 1–6, a detailed explanation is omitted.

Still another embodiment is shown in FIG. 7. A pinch roller 3 is provided on a bracket 23 which rotates about an axis 22 so as to displace the roller in a small arc toward and from capstan 1. The bracket 23, provided with an arm 25 having a connecting portion 24, is usually biased in the counter clockwise direction by a spring 26 against a lug 27. A trigger member 28 including a start button 29 is slidable right and left relative to guide pins 30 which pass through a guide groove 31. The trigger member is biased to the right by a spring 32. A lever 34 is biased at axis 36 in the counter clockwise direction by a spring member 35, which is fixed at one end at that lever, and at the other end to the trigger member 28. Movement of the trigger member by the spring is stopped by a lug 37. On the lever 34, a pin 38 is provided so as to engage the stopper 33 which is installed on the trigger member 28.

When the trigger member 28 is moved in the direction shown by the arrow B against the force of the spring 32 by depression of the trigger button 29, the pin 38 on the lever 34 is in engagement with a cam surface 25 on the arm 25. When the trigger member 28 is depressed further, the arm 25 is moved about axis 22 in the clockwise direction due to the engagement of the pin 38 on the cam surface 25' on the arm 25. That is as movement of the connecting portion 24 on the arm 25 is interrupted by the stopper 33 on the trigger member 28, the arm 25 cannot be moved in the clockwise direction thereby preventing the pinch roller 3 from engaging the capstan 1. As the lever 34 on the trigger member 28 runs on the cam edge 25' of the arm 25, it is caused to rotate about axis 36 in the clockwise direction against the force of the spring member 35. Arm 25 is intended to be rotated in the clockwise direction by the spring member 35. However, the arm cannot be rotated in the clockwise direction as the connecting portion 24 is blocked by stopper 35. When the trigger member 28 is moved further and the stopper 33 on the trigger member 28 passes the connecting portion 24, the arm 25 is suddenly rotated in the clockwise direction by the movement of the lever 34 in the counter clockwise direction through the repulsion of spring member 35. This action causes the pinch roller 3 to instantly engage the capstan 1.

When the trigger button 29 is released after actuation for photographing a sequence, the trigger member 28 is moved to the right, as shown, by the spring 32. At this time, the stopper 33 on the trigger member 28 is moved to the right over the connecting portion 24 of arm 25. When the trigger member 28 has been moved to the right, the bracket 23 is rotated in the counter clockwise direction about axis 22 by the spring 26 and its movement is stopped by stopper 27.

Figure 8:
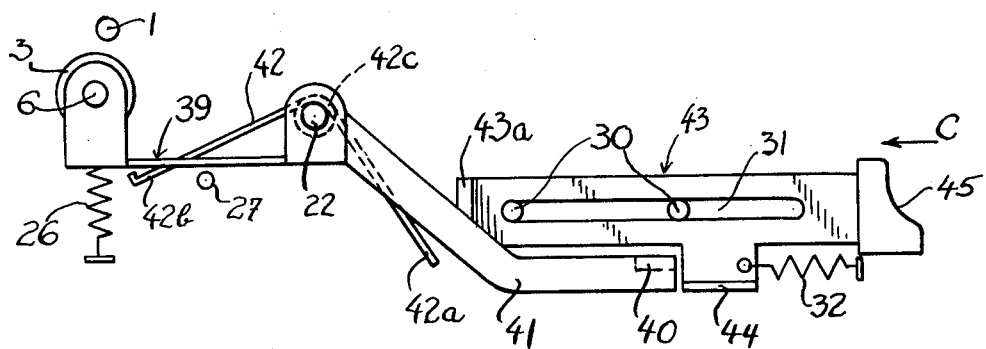

Still another embodiment is shown in FIG. 8, which embodiment is different from others in that the spring member which causes the pinch roller to engage the capstan 1 is provided not on the trigger member, but on the bracket. The pinch roller 3 which is provided on bracket 39, and is rotatable about axis 22, is pivotable to bring the rotatable pinch roller 3 against the capstan 1. The bracket 39 is biased by spring 26 so as to be rotated in the counter clockwise direction about axis 22, until stopped by stopper 27. The bracket 39 is provided with an arm 41 equipped with a connecting portion 40. A spring member 42 is installed on the bracket 39 in the manner that a coil portion 42c is fixed around the axis 22, with one end 42b extended to pinch roller 3 and the other end 42a extended to the arm 41. A trigger member 43, which is slidable with the guide pins 30 in guide groove 31 of that member, is biased to the right as shown by spring 32. The trigger member 43 is provided with a stop tab 44, which cooperates with the connecting portion or foot 40 on the arm 41, when the trigger button 45 is released.

When the trigger member 43 is moved in an actuating direction, as shown by arrow C, against the force of spring 32 upon depression of the trigger button 45, the bracket 39 is caused to be rotated in the clockwise direction about axis 22 as one end 42a of the spring member 42 is pushed by tip 43a of the trigger member 43. As the stopper 44 on the trigger member 43 is moved to the left and is positioned under the connecting portion 40 of the arm 41, the bracket 39 cannot be moved in the clockwise direction even though the tip 43a of trigger member pushes one end 42a of spring member 42. When the trigger member 43 is moved further to the left, it pushes trigger portion 42 without the movement of the bracket 39 in the clockwise direction, and tensions the spring member 42.

After actuation, when the trigger member has been moved further, the stop tab 44 is released from the connecting portion 40, which extends from arm 41. The arm 41 is suddenly rotated in the clockwise direction by the tension force of the spring member 42. The arm 41 is released by the stopper 40 so that the pinch roller 3 can instantly engage the capstan 1.

When the trigger button 45 is released after photographing a sequence, the trigger member 43 is moved to the right by the spring 32, and pinch roller 3 is separated from capstan 1 by the rotation of spring 26 in the counter clockwise direction through the rotation of bracket 39 at axis 22 as the spring member 42a is released from the tip 43a of trigger member 43 and bracket 39 is stopped by the stop pin 27.

Figure 9:
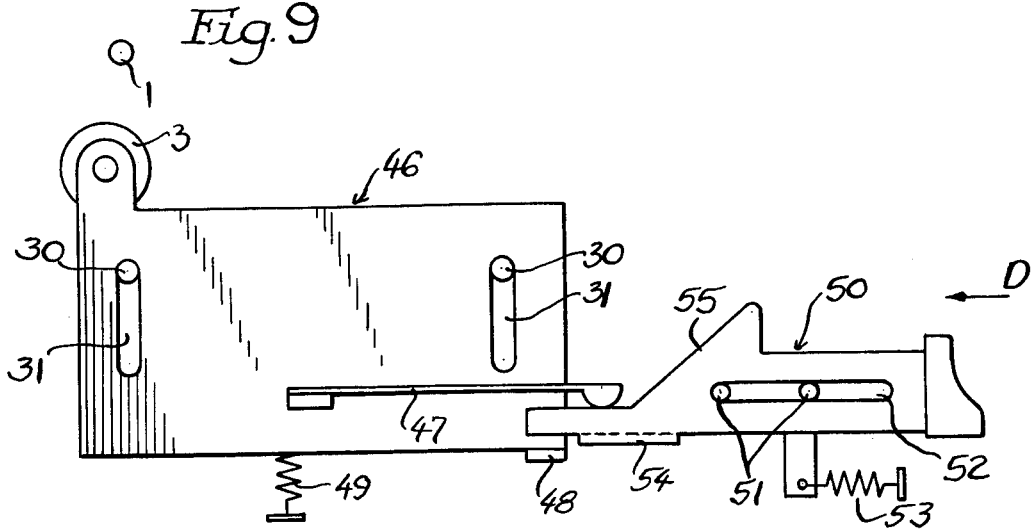

FIG. 9 shows still another example, in which the bracket which is provided with the pinch roller is not rotatable, but slidable. In this embodiment, the pinch roller 3 is caused to contact with and be separated from the capstan by the sliding movement. A bracket 46, which is slidable with guide pin 30 and guide groove 31, supports the rotatable pinch roller 3. A spring member 47 and connecting portion 48 are biased by spring 49 to separate the pinch roller 3 from the capstan.

A trigger member 50 is slidable on a guide pin 51 to the extent permitted by guide groove 52. The trigger member is biased to the inactive condition by the spring 53. A stop tab 54 extends from the trigger member 50 to cooperate with the connecting portion 48 and the cam edge 55 which cooperate with the spring member 47. When the trigger member 50 is moved in the direction shown by the arrow D against the force of the spring 53, the tip of the spring member 47 on the bracket 46 rises on the cam edge 55, and the spring member 47 raises the bracket 46 upwardly against the force of the spring 49. As stop tab 54 is moved in the direction shown by the arrow and is positioned above the connecting portion 48 of bracket 46, the bracket 46 is prevented from being moved upwardly. The bracket 46 cannot be moved upwardly when the stopper 54 is positioned above the connecting portion 48 although the trigger member 50 is moved further. The spring member 47 is positioned on an upper portion on edge 55 and tends to move the bracket 46 upwardly. When the trigger member 50 is moved further so that the stop tab 54 passes the connecting portion 48, bracket 46 is suddenly moved upwardly by spring member 47 and pinch roller 3 is instantly moved into contact with capstan 1. When the trigger member 50 is moved to the right by spring 53 after photographing, the bracket 46 carrying the pinch roller 3 is moved downwardly by spring 49 so that the pinch roller is separated from the capstan.

In summary, the pinch roller is not moved directly toward the capstan by the movement of trigger member, but is caused to engage instantly the capstan by the force of the spring member which is produced by the movement of the trigger member. Therefore, the pinch roller engages instantly with the capstan so as to transport the film captured therebetween at the definite speed rather than the gradually acquired speed which occurs as the pinch roller is gradually contacted with the capstan in the conventional pinch roller actuating device.

I claim:

1. For a motion picture camera having a second station through which a sound film is transported between a capstan and a pinch roller when the camera is activated by an actuator member, an improvement in a pinch roller actuating mechanism comprising:
    a pinch roller carrier pivoted about a fixed axis for movement of the pinch roller into and out of engagement with the capstan;
    a connecting portion extending from said carrier;
    a movable trigger member displaceable between a first position and a second position responsive to manual operation;
    a blocking means extending from a portion of said trigger member;
    limit means for stopping movement of said trigger member in said first and second positions;
    a pinch roller carrier displacing member supported on said trigger member for engaging a portion of said carrier during movement of said trigger member toward said first position and releasing said carrier during movement of said trigger member from said fist position
    whereby said connecting portion of said carrier is displaced to a position wherein said blocking means of said trigger member precludes return of said connecting member from said second position to said first position.

2. An improvement in a pinch roller actuating mechanism as in claim 1 wherein said connecting portion of said carrier is displaced outside of said blocking means when said trigger means is fully actuated to an operative position, and said pinch roller carrier is positioned to cause engagement of said pinch roller with said capstan.

3. An improvement in a pinch roller actuating mechanism as in claim 1 wherein said trigger member includes a pin member supported thereon by spring means for yieldable engagement with said pinch roller carrier whereby said carrier is caused to move said pinch roller instantly into engagement with said capstan responsive to force of said spring means.

4. An improvement in a pinch roller actuating mechanism as in claim 1 wherein said trigger member is displaced reciprocally from said first position to said second position, and means on said trigger member displaces said pinch roller carrier about an axis to move said pinch roller into and out of engagement with said capstan.

5. An improvement in a pinch roller actuating mechanism as in claim 4 wherein said means on said trigger member for displacing said pinch roller carrier is rigid, and a portion on said carrier engaged thereby is yieldable.

* * * * *

UNITED STATES PATENT OFFICE
CERTIFICATE OF CORRECTION

PATENT NO. : 4,090,783
DATED : May 23, 1978
INVENTOR(S) : Yoshiaki Mizuki

It is certified that error appears in the above-identified patent and that said Letters Patent are hereby corrected as shown below:

Column 6, line 44 (Claim 1, line 1), change "second" to --sound--.

Signed and Sealed this

Seventeenth Day of July 1979

[SEAL]

Attest:

LUTRELLE F. PARKER
Attesting Officer    Acting Commissioner of Patents and Trademarks